(12) United States Patent
Finn et al.

(10) Patent No.: US 10,474,905 B2
(45) Date of Patent: Nov. 12, 2019

(54) METHODS AND SYSTEMS FOR AUTO-COMMISSIONING PEOPLE COUNTING SYSTEMS

(71) Applicant: Carrier Corporation, Jupiter, FL (US)

(72) Inventors: Alan Matthew Finn, Hebron, CT (US); Hui Fang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 255 days.

(21) Appl. No.: 15/529,758

(22) PCT Filed: Jan. 14, 2016

(86) PCT No.: PCT/CN2016/070889
§ 371 (c)(1),
(2) Date: May 25, 2017

(87) PCT Pub. No.: WO2016/112859
PCT Pub. Date: Jul. 21, 2016

(65) Prior Publication Data
US 2018/0307913 A1   Oct. 25, 2018

(30) Foreign Application Priority Data
Jan. 15, 2015   (CN) .......................... 2015 1 0019651

(51) Int. Cl.
*G06K 9/00*   (2006.01)
*G06T 7/73*   (2017.01)

(52) U.S. Cl.
CPC ..... *G06K 9/00778* (2013.01); *G06K 9/00369* (2013.01); *G06T 7/75* (2017.01); *G06T 2207/30242* (2013.01)

(58) Field of Classification Search
USPC ................................................ 382/100, 103
See application file for complete search history.

(56) References Cited

U.S. PATENT DOCUMENTS

| | | | |
|---|---|---|---|
| 669,704 A | 3/1901 | Perry | |
| 4,303,851 A | 12/1981 | Mottier | |
| 5,465,115 A * | 11/1995 | Conrad | G06K 9/00778 348/155 |
| 7,409,076 B2 | 8/2008 | Brown et al. | |
| 7,466,844 B2 | 12/2008 | Ramaswamy et al. | |
| 7,602,944 B2 | 10/2009 | Campbell et al. | |

(Continued)

FOREIGN PATENT DOCUMENTS

| | | |
|---|---|---|
| CN | 103093198 | 5/2013 |
| CN | 103714346 | 4/2014 |

(Continued)

OTHER PUBLICATIONS

Chai, Jin "People Counting and Crowd Density Analysis in Video Surveillance", Jul. 15, 2011; 2 pages.

(Continued)

*Primary Examiner* — Ishrat I Sherali
(74) *Attorney, Agent, or Firm* — Cantor Colburn LLP

(57) ABSTRACT

The method includes collecting people counting data, fitting one or more distributions to the collected people counting data, determining a value from the one or more distributions, and setting the value as a key parameter of the people counting system.

18 Claims, 5 Drawing Sheets

(56) References Cited

U.S. PATENT DOCUMENTS

| | | |
|---|---|---|
| 7,787,656 B2 | 8/2010 | Chen |
| 7,991,193 B2 | 8/2011 | Hampapur et al. |
| 8,224,026 B2 | 7/2012 | Golan et al. |
| 8,238,603 B1* | 8/2012 | Golan ............... G06K 9/00778 382/103 |
| 8,325,976 B1 | 12/2012 | Golan et al. |
| 8,582,816 B2 | 11/2013 | Lee et al. |
| 8,731,241 B2* | 5/2014 | Johnson ............ G06K 9/00771 348/143 |
| 10,152,630 B2* | 12/2018 | Chen ................. G06K 9/00577 |
| 2005/0276446 A1* | 12/2005 | Chen ................. G06K 9/00771 382/103 |
| 2006/0269145 A1 | 11/2006 | Roberts |
| 2010/0013931 A1 | 1/2010 | Golan et al. |
| 2010/0027875 A1* | 2/2010 | Hampapur ......... G06K 9/00369 382/159 |
| 2010/0322516 A1* | 12/2010 | Xu .................... G06K 9/00778 382/173 |
| 2011/0238361 A1 | 9/2011 | Kazuya |
| 2014/0119594 A1 | 5/2014 | Chou et al. |
| 2014/0226855 A1* | 8/2014 | Savvides ............ G06K 9/00771 382/103 |
| 2016/0253579 A1* | 9/2016 | Bamba ................ G06K 9/2081 382/103 |

FOREIGN PATENT DOCUMENTS

| | | |
|---|---|---|
| WO | 2009004479 | 1/2009 |
| WO | 2010099470 | 9/2010 |

OTHER PUBLICATIONS

International Search Report and Written Opinion, International Application No. PCT/CN2016/070889, dated Apr. 12, 2016, China Intellectual Property Office; International Search Report 5 pages, Written Opinion 4 pages.

* cited by examiner

METHODS AND SYSTEMS FOR AUTO-COMMISSIONING PEOPLE COUNTING SYSTEMS

CROSS REFERENCE TO RELATED APPLICATIONS

This is a U.S. National Stage of Application No. PCT/CN2016/070889, filed on Jan. 14, 2016, which claims the benefit of Chinese Patent Application No. 201510019651.X, filed on Jan. 15, 2015, the disclosures of which are incorporated herein by reference.

BACKGROUND OF THE INVENTION

Embodiments of the invention are related to people counting systems and more particularly to auto-commissioning of people counting systems.

Video systems for people counting are used in various applications, such as security, HVAC energy optimization, crowd control and management, and business and retail analytics. Video systems for people counting have historically used two approaches—(i) detect and track individual people, with an attendant risk to privacy and potential inaccuracy from tracking in crowded situations, or (ii) detect motion and integrate the motion across an area. These latter systems include a critical or key parameter used to convert the integrated motion into a person count, wherein the integrated motion corresponds to a "person size" and is counted as an individual, or a specific (integer) number of individuals in a group.

Installation of these video people counting systems incurs considerable expense, in part due to the labor required to install and commission the system, i.e., bring the system into working condition to perform people counting.

BRIEF DESCRIPTION OF THE INVENTION

According to one embodiment a method of auto-commissioning a people counting system is provided. The method includes collecting people counting data, fitting one or more distributions to the collected people counting data, determining a value from the one or more distributions, and setting the value as a key parameter of the people counting system.

In addition to one or more of the features described above, or as an alternative, further embodiments may include that the people counting data comprises an integrated pixel count of activated pixels. Further, in some embodiments, said fitting of one or more distributions comprises a first Gaussian curve fit to the people counting data and a second Gaussian curve fit to the people counting data. In some such embodiments, the first Gaussian curve represents a single person count and the second Gaussian curve represents a two person count.

In addition to one or more of the features described above, or as an alternative, further embodiments may include repeating the collecting step, the fitting step, and the determining step one or more times, and determining when the peak value converges on a single value.

In addition to one or more of the features described above, or as an alternative, further embodiments may include the people counting system having a sensing device for sensing people crossing a counting area.

In addition to one or more of the features described above, or as an alternative, further embodiments may include the setting step comprises setting a key parameter for a single person count, a two person count, and a three person count.

In addition to one or more of the features described above, or as an alternative, further embodiments may include the people counting system is configured as part of a person transportation system.

According to another embodiment, a people counting system is provided. The people counting system includes a sensing device configured to observe movement across a counting area, a processor in communication with the sensing device and configured to set the counting area, the processor configured to perform a self-commissioning of the system. The self-commissioning includes collecting people counting data, fitting one or more distributions to the collected people counting data, determining a value from the one or more distributions, and setting the value as a key parameter of the people counting system.

In addition to one or more of the features described above, or as an alternative, further embodiments may include wherein the people counting data comprises an integrated pixel count of activated pixels of a view of the sensing device.

In addition to one or more of the features described above, or as an alternative, further embodiments may include, wherein said fitting of one or more distributions comprises a first Gaussian curve fit to the people counting data and a second Gaussian curve fit to the people counting data. In some such embodiments, the first Gaussian curve represents a single person count and the second Gaussian curve represents a two person count.

In addition to one or more of the features described above, or as an alternative, further embodiments may include, wherein the processor is further configured to repeat the collecting step, the fitting step, and the determining step one or more times, and determine when the peak value converges on a single value.

In addition to one or more of the features described above, or as an alternative, further embodiments may include, wherein the setting step comprises setting a key parameter for a single person count, a two person count, and a three person count.

In addition to one or more of the features described above, or as an alternative, further embodiments may include, wherein the people counting system is configured as part of a person transportation system.

Technical effects of embodiments of the invention include an auto-commissioning people counting system. Further technical effects include an accurate determination of key parameter(s) during auto-commissioning of people counting systems, thus providing an accurate and reliable people counting system. Additional technical effects include a people counting system that able to determine when it is inaccurate, and thus re-auto-commission and continue to provide an accurate and reliable people counting system that maintains itself.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Embodiments of the invention provide an image-based or video-based people counting system that automatically and accurately self-commissions and determines the key parameters of the system. Thus embodiments of the invention provide a system that does not rely on an installer's labor for the commissioning process. During auto-commissioning, the system employs estimation techniques using a representative sample of image/video data to automatically estimate the key people count parameter(s), or "key parameter(s)," of the motion-integration people counting system.

Figure 1:
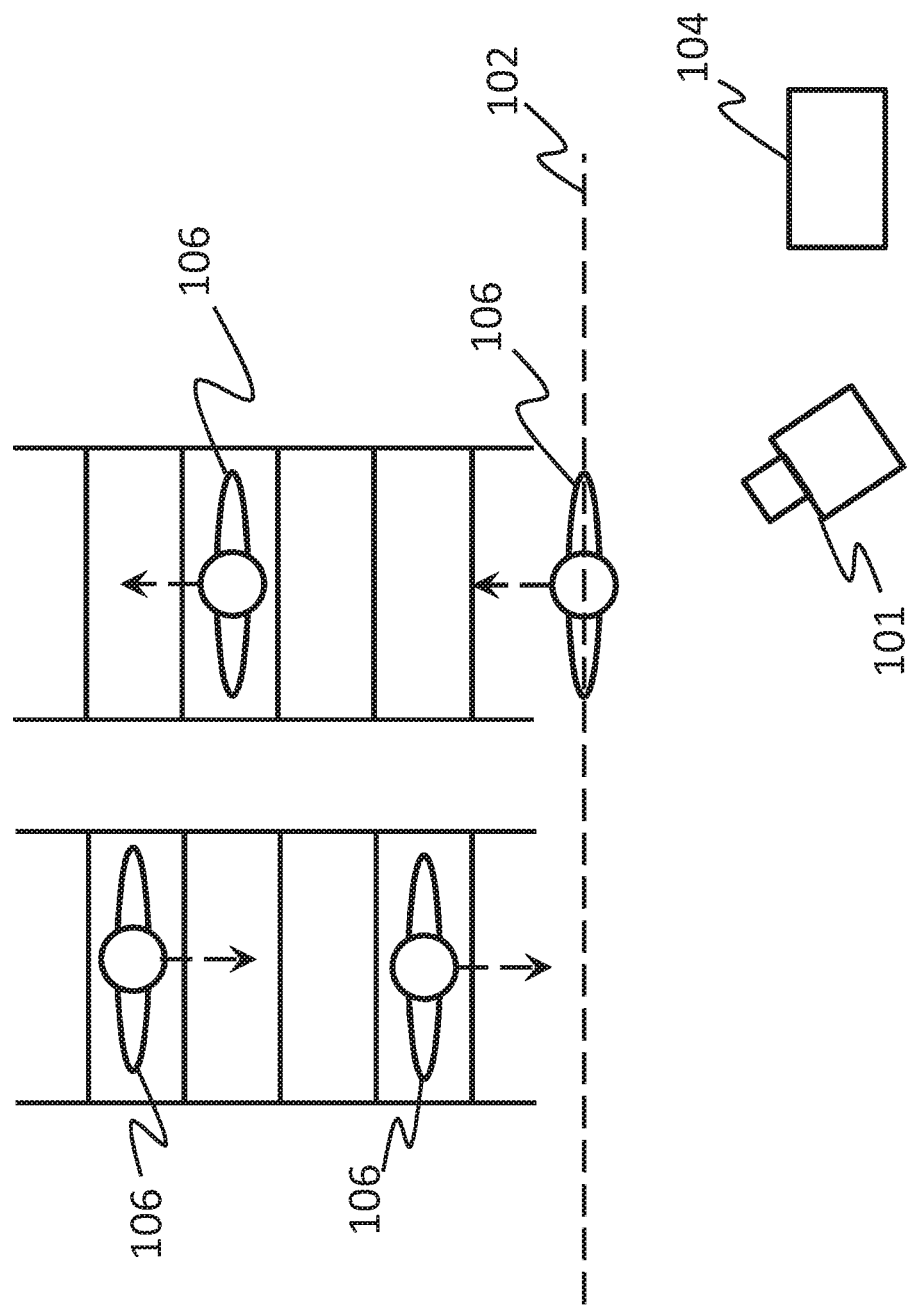
FIG. 1 is an exemplary configuration of a people counting system.

Referring to FIG. 1, an illustration of an exemplary people counting system 100 configuration is shown. In FIG. 1, a sensing device 101, such as a video camera, optical sensor, IR sensor, 2D sensor, 3D sensor, etc., is provided for monitoring and counting people that cross a pre-designated imaginary (or digital) area 102, hereinafter "counting area." Sensing device 101 is connected to a computer or other processing device 104. Computer 104 may include a central processing unit, volatile and non-volatile memory, and input/output devices, such as display(s), keyboard(s), etc. The computer 104 is configured to define the counting area 102 and process information or data received from the sensing device 101, such as data indicating a motion across the counting area 102. The data may be a number of pixels that change in color, brightness, etc. or based on some other criteria for recognizing motion in an image or video. Although shown with sensing device 101 and computer 104 as two separate and distinct components, those of skill in the art will appreciate that the two devices may be combined or configured as a single unit or component. Further, although shown with computer 104 next to sensing device 101, this is merely provided for exemplary purposes, and those skilled in the art will appreciate that computer 104 may be located anywhere remote from the sensing device 101, and the two components may communicate electronically by means of any known communication protocol, including, but not limited to Bluetooth®, Wi-Fi, hardwired line, etc.

When using sensing device 101 and computer 104, for example, when people 106 cross counting area 102 as viewed with sensing device 101, the computer 104 can determine that a person has crossed the counting area 102 based on the detected motion across the counting area 102 and collect data related thereto. Detected motion may be detected by a change in the pixels that represent, form, or define counting area 102 on the sensing device 101. For example, when a person or object passes across the counting area 102, the sensing device 101 and/or computer 104 may detect a change in the color, brightness, intensity, etc. of various pixels that make up or define the counting area 102. Hereinafter, the pixels that change due to a motion will be referred to as "activated pixels."

Figure 2:
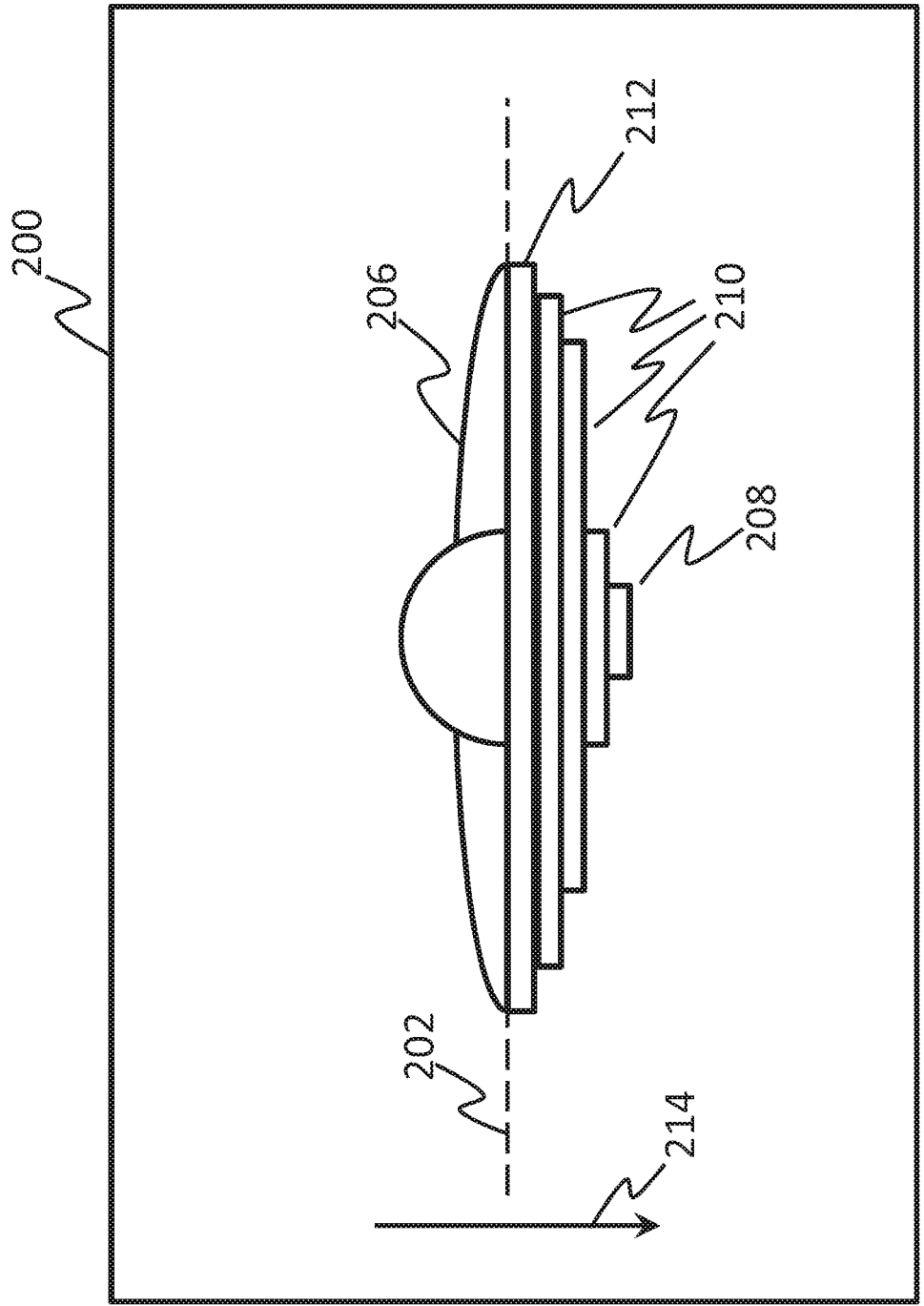
FIG. 2 is a schematic of an image of a counting of a person with an automated people counting system.

Referring now to FIG. 2, a representation of the activated pixels and the integrated motion of a person 206 crossing a counting area 202 is shown. Image 200 represents the overhead view as seen by a sensing device, such as sensing device 101, or as viewed on a display screen on a computer such as computer 104. Image 200 includes a counting area 202 which is a virtual area that is pre-set and indicates the location that is monitored for the purpose of people counting. Counting area 202 is defined as a plurality of pixels in the image 200. Thus, as pixels of counting area 202 are activated due to motion, integrating the motion will provide a pixel count of the activated pixels due to the motion. The number of pixels can then be used to determine the number of people that cross the counting area 202.

In practice, a processor or similar device will count the number of pixels that are activated by a person 206 crossing the counting area 202. As the person 206 passes through the counting area 202, different numbers of pixels will be activated throughout the motion, based on, for example, the size and shape of the person among other factors. Then a pixel block 208, 210, 212 can be defined and its size can be estimated based on multiplying the number of activated pixels on the counting area (width of the block) by the average speed of those activated pixels (height of the block). The speed can be calculated by any well-known technique, e.g. optical flow. The value of motion integration is the value of integrating all pixel blocks. By using the pixel speed information, the system gives accurate integration values under different people moving speeds.

As shown in FIG. 2, as the person 206 moves in moving direction 214, pixel block 208 represents the first portion of the person 206 that crosses counting area 202, such as a portion of the head of the person 206. Similarly, pixel blocks 210 represents the beginnings of the shoulders of the person 206, which is a larger number of pixels than pixel block 208. Pixel block 212 represents the full width of the person 206 at the shoulders, and is thus a larger number of pixels than pixel blocks 210. Thus, the system may collect data related to pixels that are activated over time due to detected motion.

The system, processor, or other device may then integrate the number of pixels activated in pixel blocks 208, 210, and 212, and any other pixel blocks activated by the movement of the person 206 across counting area 202 over the duration of the motion. In the example of FIG. 2, the integrated number of pixels represents that a single person crossed the counting area 202, and a count or tally may be made for the purposes of people counting. With a single person, the counting/tallying may be simple based on the number of pixels that are impacted by the person walking across the counting area 202. However, this is more difficult when more than one person crosses the counting area 202, or when crowds of people are crossing the counting area 202.

When a single person 206 crosses the counting area 202, the detected motion (activated pixels) goes from zero to some non-zero value and then back to zero, after person 206 completes crossing counting area 202. Correspondingly, the integrated motion goes from some first value, such as zero or some constant value, to a second and different value. If a motion transition from the first value to the second value is uniquely identified, the difference in values is the integrated motion value may correspond to an integer number of people crossing the counting area 202. Thus, the second value of this example must be predetermined or known in order to distinguish between one person, two people, three people, etc. crossing the counting area 202. This second value will be referred to as a key person count parameter or key parameter, and there will be a key parameter for each integer number of people crossing the counting area 202. Determining and setting the key parameters is referred to as commissioning of the system.

Traditionally, ground-truth data, e.g., actual knowledge of the number of people crossing a counting area, is required when commissioning and setting up a people counting system because the integrated motion (number of pixels) is dependent, at least in part, on the sensing/imaging/camera angle, sizes and shapes of people, carried items, wheelchairs, occlusion provided by people blocking the "view" of another person, etc. Because of these factors that impact the number of pixels counted in an integrated motion, there is no perfect number that represents each number of people that cross a counting area. For example, if two people cross the area with their arms around each other, the number of pixels counted in an integrated motion may be different than if the two people cross the area and are not touching at all. Thus, the key parameters are estimates of the number of pixels that represent an integer number of people crossing the area. Then, when a number of pixels are activated that are between two of the key parameter numbers, the counted number may be rounded to the closest key parameter number for the purpose of people counting.

Accordingly, when a technician commissions or sets up a system, the technician may attempt to calibrate the system by applying a ground-truth, i.e., use the system when known numbers of people cross the counting area. The technician must use this known information to establish or set the key parameter(s) so that the system will count the number of people crossing the counting area when activated. However, this process can result in inaccuracies because the number of pixels activated by a person crossing the counting area may not be the same for all situations, as described above. Even if many of the potential situations of people crossing the counting area could be presented to the system, when a technician must determine the key parameters, the system will still be prone to human error.

Figure 3:
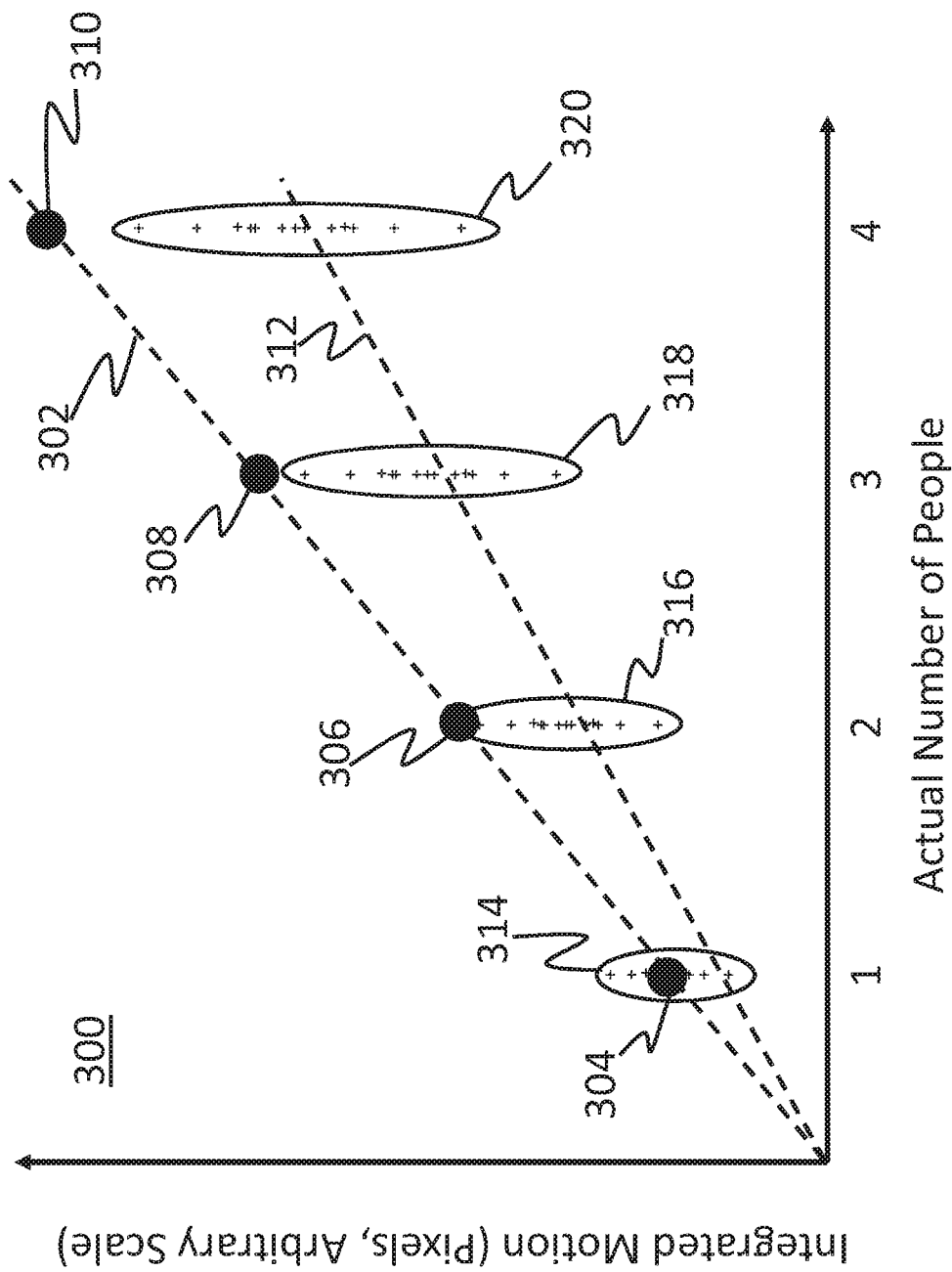
FIG. 3 is an exemplary plot of a fit of data representing the number of pixels in an integrated motion that represents an integer number of people.

Turning now to FIG. 3, a plot 300 is shown which demonstrates the issue of occlusion in people counting systems. In FIG. 3, the horizontal axis is the actual (or ground-truth) number of people that cross a counting area. The vertical axis is the integrated motion, in pixels and set to an arbitrary scale that are counted or detected when motion across the counting area is detected. FIG. 3 is an exemplary data plot of the variety of numbers of pixels/integrated motion that integer numbers of people can produce and shows the impact of occlusion.

In FIG. 3, line 302 represents an ideal proportional linear fit, wherein the number of pixels of integrated motion increases proportionally linearly. That is, when a single person crosses the counting area, the point 304 represents the number of pixels activated, and this is the number of pixels (point 304) that are activated each and every time a single person crosses the counting area. Similarly, point 306 indicates the number of pixels activated each and every time two people cross the counting area, wherein point 306 is twice the number of pixels of point 304. Similarly, point 308 represents three people and is three times the number of pixels as point 304, and point 310 represents four people and is four times the number of pixels as point 304. In each of these situations, the number of pixels generated each time by the integrated motion is the same for each integer number of people, and represented at a single point on the plot.

However, as shown with line 312, an actual linear average representation of the activated pixels determined by the integrated motion does not create a simple proportionally linear fit similar to line 302. In contrast to the "ideal situation" of line 302, various different numbers of pixels may be activated each time an integer number of people cross the counting area, even when ground-truth is known. For example, with reference to data points 314, the number of pixels in an integrated motion of a single person is plotted from a representative sampling of data. As shown, a single person may create or generate more or fewer activated pixels (data points 314) than the ideal (point 304, on line 302). As discussed above, this may be a result of the person carrying items, the height and/or weight of the person, the angle at which the person is facing when crossing the counting area, the person is in a wheelchair, or due to other factors or combinations thereof. Thus, the points 314, representing the passage of one person crossing the counting area are distributed over a range of values.

Similarly, when two people cross the counting area, the numbers of pixels of integrated motion are distributed over a range of values shown as data points 316. In addition to the variables that can distort or change the values when one person crosses a counting area, when more than one person crosses the counting area, occlusion may occur. Occlusion is the complete or partial obstruction of the view from the sensing device used to perform the people counting. For example, one person may block the line of sight of the sensing device to view another person, and some pixels/integrated motion of the blocked or occluded person will not be counted or even observed, thus causing a reduction in the total count obtained. For example, in FIG. 3 and due to occlusion, all of the points 316 that were counted and represent two people are below "ideal" point 306. This continues for three people shown as points 318, and four people shown as points 320, with the variety and/or distribution becoming greater as the number of people increases. This is a result of more and more possible occlusion, and the variances that such occlusion can create.

Thus, referring to FIG. 3, for one person crossing the counting area the pixel count distribution of data points 314 represents the distribution of individual people that crossed the counting area during the sampling. Similarly, the pixel count distribution of points 316 represents the pixel count distribution of two people crossing the counting area, and so on.

Referring still to FIG. 3, the data points 314, 316, 318, and 320 can be used to formulate a linear relationship, or some other relationship, that can be used to represent when a specific number of people cross a counting area. The relationship may be based on the average value at each of the integer points, or based on some other criteria. Depending on the application and the number of sample data points collected, and in some embodiments, FIG. 3 can represent the general size (pixel count) distribution of a population, in groups of one, two, three, and four people crossing the counting area at a time and line 312 may be a general representation of the average number of pixels activated during motion across the counting area.

Thus, if the ideal linear, proportional fit 302 is used to compute the key parameter(s), the result will be biased or inaccurate due to a lack of compensation for occlusion when multiple people cross the counting area. As shown, if the fit 302 was used, a majority of data points 314 and 316 may be counted as a single person, and some of the data points 318 and 320 may be counted as only two people crossing the counting area, rather than three or four people, respectively. Further, it is possible that if the fit 302 was used, four people crossing the counting area may never be counted due to occlusion and the large offset of data points 320 from the ideal point 310. In view of this, the fit 312 should be used for people counting. However, even if line 312 is used, variation still occurs and the pixel count of an integrated motion may be rounded to the closest integer fit on line 312.

In view of the above, it has been demonstrated that human-based commissioning of people counting systems may be inaccurate due to the inherent inaccuracies and variables, plus human error. Thus, embodiments of the invention are directed to provide a reliable, self-commissioning system.

In accordance with embodiments of the invention, the key parameters may be automatically and accurately calculated and set by the system itself. In accordance with some embodiments, data may be collected that enables modeling of various mathematic distributions. For example, Gaussian fits may be applied to an aggregate of data to determine the key parameters (FIG. 4)—rather than relying on linear fits (FIG. 3). The Gaussian modeling enables a mean (and variance) of the integrated-motion-to-people-count to be obtained. From the mean value (or peak of the Gaussian curve) the key parameter may be determined, and the variance may enable an accurate ability to round to the closest integer count of people. In some embodiments, a probabilistic person count estimate may be obtained, i.e., given a particular integrated motion value, the corresponding probability of how many people crossed the counting area may be obtained.

Figure 4:
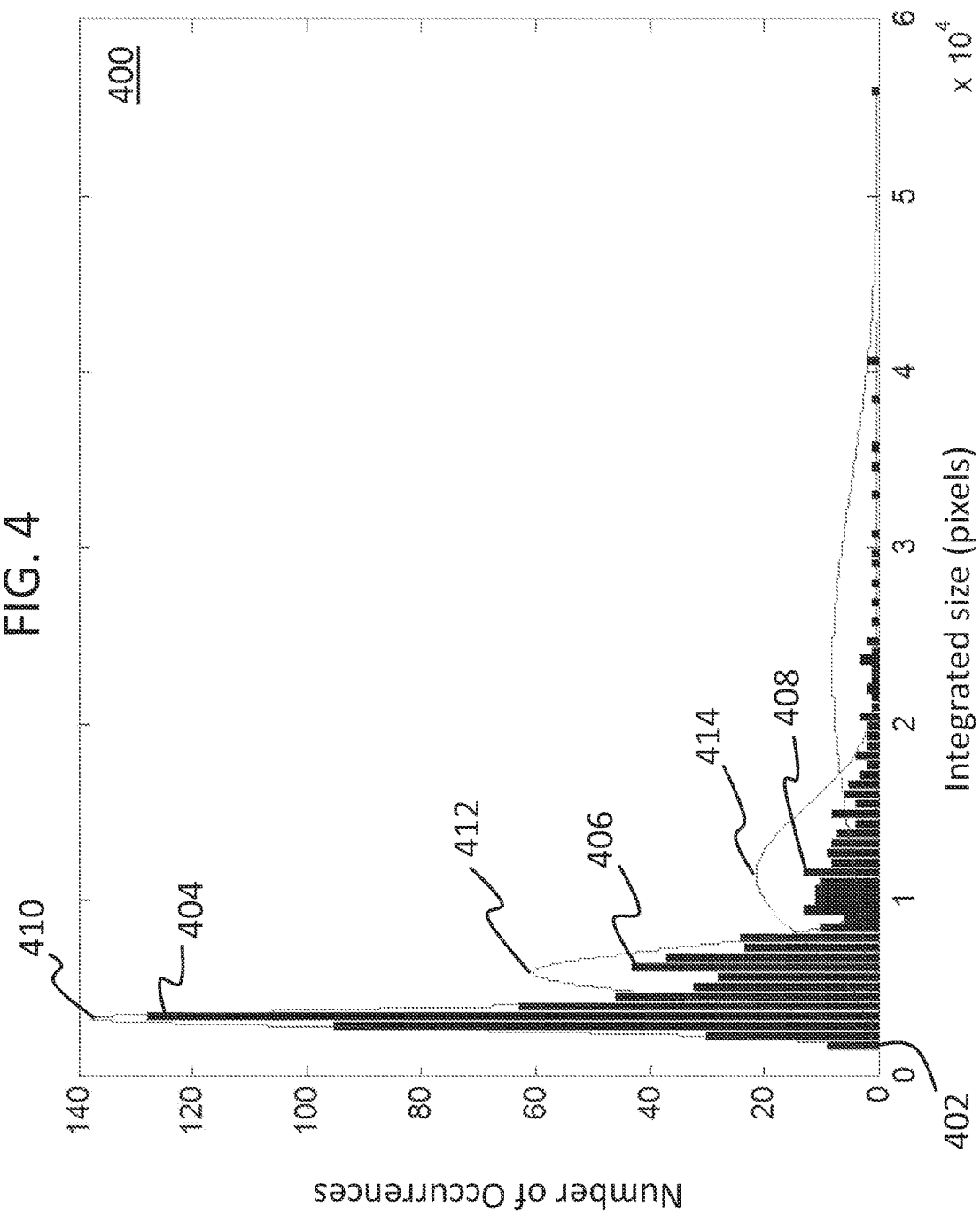
FIG. 4 is an exemplary histogram plot of integrated motion with Gaussian fits to real-world data points in accordance with an exemplary embodiment of the invention.

Referring to FIG. 4, a histogram plot 400 shows an exemplary real-world sample of people counting data representing people passing over a counting area. The x-axis represents the number of pixels of the integrated motion in ten thousands ($10^4$) and the y-axis represents the number of occurrences during the testing that that number of pixels (or range of pixels) were counted. For example, in FIG. 4, the farthest left bar 402 represents about 1700 pixels and had an occurrence of about 10 during the sample testing. It is noted that there is an "empty" or blank spot on the furthest left portion of plot 400. This is due to pre-filtering of some small data values which, if included, may skew the results. The pre-filtering is used, in part, because there is a reasonable minimum size of a person in terms of pixels activated, and the pre-filtering eliminates noise from the sampling that is likely not a person crossing the counting area.

As data is collected over time, a number of bars of the histogram are formed, and a pattern will emerge. With reference to FIG. 3, it was shown that due to occlusion, the pixel count is not perfectly proportional. However, there will emerge certain pixel counts or ranges of pixel counts that occur more often than not when one person, two people, three people, etc. cross the counting area. This is shown in FIG. 4 by a series of peaks 404, 406, 408, which have a high incidence of occurring. These peaks 404, 406, 408 can be assumed to represent one person, two people, and three people, respectively. However, there are overlapping counts, and counts that do not fit within or at the peaks 404, 406, 408. The overlapping may occur when two people activate the same number of pixels as three people, due to occlusion, or other factors. Thus a distribution of data arises, as shown in FIG. 4.

With this data, the system can fit Gaussian curves to the data (rather than linear fits as in FIG. 3). Thus, Gaussian fit 410 fitted as a first Gaussian distribution of the data, and encompasses, ideally, the data that represents a single person crossing the counting area. In the exemplary data of FIG. 4, the first Gaussian fit 410 has a mean value of 3,319 pixels, which is the maximum or peak value of the fit 410, and a variance of 585 pixels. This value (3,319) represents the average number of pixels of one person crossing the counting area, and thus the value extracted from the first Gaussian fit is the key parameter for this integer (one). Thus, the key parameter for a single person crossing the counting area is 3,319 pixels, in this example. Further, any counts of about 2,734 pixels to about 3,904 can also be counted as a single person, based on the variance.

Next, a second Gaussian fit 412 is fit to the data and is based around the second peak 406. Because this is the second Gaussian fit, it represents two people crossing the counting area at the same time. In this example, the peak of fit 412 is 5,963 pixels with a variance of 1,286 pixels. Similarly, the third Gaussian fit 414 is fit to the data with a peak value of 11,429 pixels and a variance of 3,744 pixels and represents three people crossing the counting area at the same time. As demonstrated in FIG. 4, the number of pixels that represent two people (5,963 pixels) is not twice the number of pixels that represent one person (3,319 pixels). In this example, the higher mean Gaussian distributions are increasingly inaccurate due to the limited data and wide spread of the data. However, as more data is collected, the more accurate the results will be.

The system can then take the pixel count of each Gaussian peak, and set that number as the key parameter for people counting of each integer number of people. For example, using the data points provided in FIG. 4, the Gaussian fit 402 may be the converged first Gaussian fit for one person, and the peak pixel count is set as the key parameter for a single person crossing the counting area, i.e., 3,319 pixels for the integrated motion of a single person crossing the counting area. Similarly, the system may apply the converged second Gaussian fit 404 to represent two people crossing the counting area and select the peak pixel count as the key parameter for two people, i.e., 5,963 pixels for the integrated motion of two people crossing the counting area. This can be continued for three people and higher.

During self-commissioning, a system may operate for a period of time in order to obtain sufficient data points to fit the Gaussian curves and extract the key parameters. The system may be configured to "know" when the key parameters have been reached, i.e., the system can know when sufficient data has been collected. For example, the system may operate with a pre-set configuration based on the information presented in FIG. 3 as a baseline or guideline. Thus, the system may have an "idea" of the integrated motion pixel count that represents one person, two people, three people, etc. Then, when the Gaussian curves converge after repeating fittings to values similar to that provided by in FIG. 3, the system will know that the fits are accurate and the key parameters may be set. The advantage to this process, over merely setting the values to those from FIG. 3, is that the real-world variance associated with the system may be determined.

Furthermore, as the system operates, it may adjust the key parameter(s) based on continued real-world observation and data collection. For example, even after the system has completed self-commissioning, the system may continuously or periodically check the Gaussian fits used to determine the key parameters, and adjust the values as necessary.

Further, if the system is set up such that the angles are different from the guideline numbers (FIG. 3), the key parameter(s) can be adjusted to provide the most accurate people counting results based on real-world observation rather than predetermined calculations and/or simulations. The system may generate a histogram as shown in FIG. 4, or one that includes more data and thus more accurate results. However, in any case, as data points are collected, once the peak(s) of the histogram(s) begin to emerge, Gaussian fits may be applied to determine the key parameters. As more data points are collected, the Gaussian fits may be applied again and refit, and over time will converge and result in a best fit Gaussian. Because of the convergence based on the collected data, in some embodiments there is no need for the fit of FIG. 3 to be known or applied at all, as the mere convergence of Gaussian fits to a particular value will be sufficient to determine and set the key parameters of the system.

When the Gaussian fits are settled or have converged, the system will set the key parameters, and complete the auto-commissioning process. The system will then be ready to provide accurate people counting without the need of human error impacting the commissioning of the system.

Figure 5:
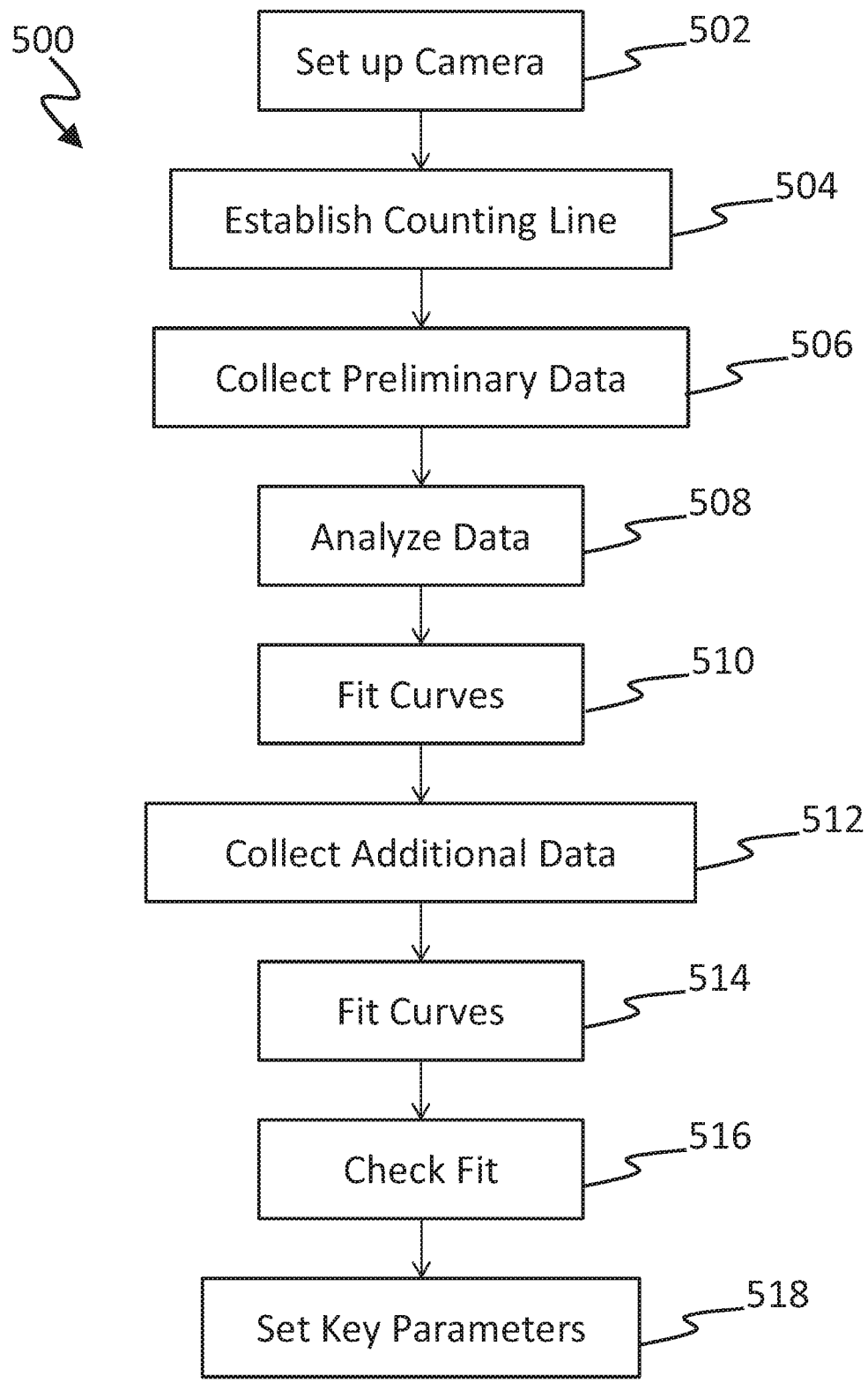
FIG. 5 is a flow chart of a process of auto-commissioning in accordance with an exemplary embodiment of the invention.

Turning now to FIG. 5, a flow chart of an exemplary process 500 of auto-commissioning a people counting system in accordance with embodiments of the invention is shown. At step 502, a sensing device is set up at a location to be monitored for people counting. At step 504, a counting area is established for the system. Then at step 506, the system collects preliminary data. The preliminary data collecting entails counting the number of times specific numbers of pixels of integrated motion are counted each time the counting area is crossed (see, e.g., FIG. 4). At step 508 the system may plot the collected data or mathematically analyze and/or prepare the data. At step 510 the system will apply or fit distributions, such as Gaussian curves, to the collected data. Further, the system can continue to collect data at step 512, and at step 514 distribution fits may be applied again. At step 516, the system determines if the distribution fit(s) have converged or do not change within a certain variance or range. If the distribution fits have not converged, the system may return to step 512 and collect additional data. However, if the distribution fits have converged, the system can extract or determine the key parameter(s) of the people counting system at step 518, and complete the auto-commissioning of the system.

In some embodiments, the system may perform the auto-commissioning process from time to time to recalibrate or check the key parameters and/or to verify the accuracy of the system. As such, the auto-commissioning may be performed at any time once the system is physically installed.

Advantageously, embodiments of the invention provide an accurate system for auto-commissioning a people counting system. Further, advantageously, embodiments of the invention eliminate the need to rely on human interaction during auto-commissioning and eliminate human error from the system. Further, advantageously, in some embodiments, the systems can self-determine when auto-commissioning is complete, or may need to be re-calibrated, using the disclosed processes.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, as noted above, other types of mathematical representations or fits may be applied when determining the key parameters in accordance with embodiments of the invention. For example, other mathematical distributions other than Gaussian distributions may be used such as lognormal, or other distributions known or to become known in the art. Using different distributions may depend, in part, on the underlying distribution of the data. Additionally, although described and shown as a graphical fit of the data, those skilled in the art will appreciate that this is not required, and the fitting may be performed computationally with a processor. Further, although FIG. 4 shows only four Gaussian fits, this can be any number, and as the number of data points increases, they accuracy of these fits will also increase. Moreover, in some embodiments, rather than relying on the variance of the Gaussian curves to determine the proper "rounding" of the counting, a single count may merely be rounded to the closest integer number for the purpose of counting people.

Furthermore, the physical components of the system may be different than described above. For example, in some embodiments, the sensing device and computer may be configured as a single unit. Moreover, various steps of the auto-commissioning process described herein may be omitted or repeated, or other steps may be added without departing from the scope of the invention. For example, only one data set may be required for determining the key parameters, without the need to "refit" the plots. This may occur when the auto-commissioning process is carried out for sufficient duration to obtain a high quantity of data to fit accurate curves to the data and extract the key parameters.

Further, the term sensing device, as used herein, encompasses cameras, videos, detectors, 2D sensing, 3D sensing, that can be configured to detect a movement. Further, the terms "image" and "video" are used generically in this disclosure for any 2D or 3D sensing device output. It is well known to one of ordinary skill in the art that there are multiple 3D (depth) sensing technologies including, but not limited to, structured light, phase shift, time of flight, stereo triangulation, sheet of light triangulation, light field cameras, coded aperture cameras, computational imaging techniques like depth from defocus, structure from motion (SFM), simultaneous localization and mapping (SLAM), imaging radar, imaging sonar, scanning LIDAR, flash LIDAR, etc. Equally, it is well known to one of ordinary skill in the art that different 2D or 3D camera technologies may be active or passive and may be operable in various bands of the electromagnetic or acoustic spectrum.

Further, embodiments described herein may be applied, advantageously, to various person transportation systems. For example, the auto-commissioning and people counting systems described herein may be used to count persons that use elevators, escalators, people movers, etc. Further, such systems may be used in crowd control and management and/or for HVAC applications, such as determining the number of people within a building or other space.

Accordingly, the invention is not to be seen as limited by the foregoing description, but is only limited by the scope of the appended claims.

What is claimed is:

1. A method of auto-commissioning a people counting system of a person transportation system, the method comprising:

collecting people counting data associated with the person transportation system using a sensing device arranged to detect people crossing a counting area, wherein the counting area is a pre-designated area associated with the person transportation system;

using a processor to fit one or more distributions to the collected people counting data;

determining, with the processor, a value from the one or more distributions; and setting, with the processor, the determined value as a key parameter of the people counting system, wherein the collecting, fitting, determining, and setting are performed automatically using the processor and sensing device in response to an instruction to auto-commission the people counting system without human interaction during the auto-commissioning process as executed by the processor and using the sensing device, and wherein the setting step comprises setting a key parameter for a single person count, a two person count, and a three person count.

2. The method of claim 1, wherein the people counting data comprises an integrated pixel count of activated pixels.

3. The method of claim 1, wherein said fitting of one or more distributions comprises a first Gaussian curve fit to the people counting data and a second Gaussian curve fit to the people counting data.

4. The method of claim 3, wherein the first Gaussian curve represents a single person count and the second Gaussian curve represents a two person count.

5. The method of claim 1, further comprising:
repeating the collecting step, the fitting step, and the determining step one or more times; and
determining when the peak value converges on a single value.

6. A people counting system comprising:
a sensing device configured to observe movement across a counting area;
a processor in communication with the sensing device and configured to set the counting area, wherein the sensing device and processor are part of a person transportation system and the counting area is a pre-designated area of the person transportation system;
the processor configured to perform a self-commissioning of the system, wherein the self-commissioning is performed without human interaction as executed by the processor and using the sensing device, the self-commissioning comprising:
collecting people counting data;
fitting one or more distributions to the collected people counting data;
determining a value from the one or more distributions; and
setting the value as a key parameter of the people counting system,
wherein the setting step comprises setting a key parameter for a single person count, a two person count, and a three person count.

7. The system of claim 6, wherein the people counting data comprises an integrated pixel count of activated pixels of a view of the sensing device.

8. The system of claim 6, wherein said fitting of one or more distributions comprises a first Gaussian curve fit to the people counting data and a second Gaussian curve fit to the people counting data.

9. The system of claim 8, wherein the first Gaussian curve represents a single person count and the second Gaussian curve represents a two person count.

10. The system of claim 6, wherein the processor is further configured to:
repeat the collecting step, the fitting step, and the determining step one or more times; and
determine when the peak value converges on a single value.

11. The system of claim 6, wherein the person transportation system is an escalator.

12. The system of claim 6, wherein the person transportation system is an elevator.

13. The method of claim 1, wherein the person transportation system is an escalator.

14. The method of claim 1, wherein the person transportation system is an elevator.

15. A method of auto-commissioning a people counting system of a person transportation system, the method comprising:
collecting people counting data associated with the person transportation system using a sensing device arranged to detect people crossing a counting area, wherein the counting area is a pre-designated area associated with the person transportation system;
using a processor to fit one or more distributions to the collected people counting data;
determining, with the processor, a value from the one or more distributions; and
setting, with the processor, the determined value as a key parameter of the people counting system,
wherein the collecting, fitting, determining, and setting are performed automatically using the processor and sensing device in response to an instruction to auto-commission the people counting system without human interaction during the auto-commissioning process as executed by the processor and using the sensing device, and
wherein said fitting of one or more distributions comprises a first Gaussian curve fit to the people counting data and a second Gaussian curve fit to the people counting data, wherein the first Gaussian curve represents a single person count and the second Gaussian curve represents a two person count.

16. The method of claim 15, wherein the people counting data comprises an integrated pixel count of activated pixels.

17. The method of claim 15, further comprising:
repeating the collecting step, the fitting step, and the determining step one or more times; and
determining when the peak value converges on a single value.

18. The method of claim 15, wherein the setting step comprises setting a key parameter for a single person count, a two person count, and a three person count.

* * * * *